No. 828,986. PATENTED AUG. 21, 1906.
W. VOGEL.
GRADE GAGE.
APPLICATION FILED OCT. 21, 1905.

2 SHEETS—SHEET 1.

Witnesses
Estelle V. Wale.
Sigmund Herzog

Inventor
William Vogel
By his Attorney
Max F. Ordmann

No. 828,986. PATENTED AUG. 21, 1906.
W. VOGEL.
GRADE GAGE.
APPLICATION FILED OCT. 21, 1905.

2 SHEETS—SHEET 2.

Witnesses
Estelle V. Wale.
Sigmund Herzog.

Inventor
William Vogel
By his Attorney
Max D. Ordman

UNITED STATES PATENT OFFICE.

WILLIAM VOGEL, OF NEW YORK, N. Y., ASSIGNOR TO BETTY VOGEL, OF NEW YORK, N. Y.

GRADE-GAGE.

No. 828,986.  Specification of Letters Patent.  Patented Aug. 21, 1906.

Application filed October 21, 1905. Serial No. 283,775.

*To all whom it may concern:*

Be it known that I, WILLIAM VOGEL, a citizen of the United States, residing at the city of New York, in the county of New York and State of New York, have invented certain new and useful Improvements in Grade-Gages, of which the following is a specification.

The present invention pertains to improvements in grade-gages for automobiles or other vehicles, and more particularly to such gages composed of mechanical operative parts actuated by gravity, and has for its object to provide a simple inexpensive highly-sensible grade-gage by means of which changes in the grade of the road on which the vehicle runs will be indicated with the greatest accuracy upon a suitable dial. The construction of the device permits it also to be used as an ordinary level to indicate changes of level and the angles thereof and likewise as a device for indicating the trim of vessels. The devices hitherto used for the same purpose show the drawback that the gear-wheels employed for the transmission of the motions of the pendent weight or plumb-bob to the pointer or dial allow the indication of but limited fractions of changes of grade, the limitation being conditioned by the width of the intermeshing teeth of the gear-wheels. Smaller fractions can thus not be indicated. To remove this drawback and to render the device more sensible, I have replaced the gear-wheels by rollers and a cord or the like attached thereto and adapted to wind up and off the same, whereby the slightest fraction of movement of one roller is transmitted to the other. The sensibility of my device is still increased by an exact construction, arranging the various parts so as to permit a perfect fit thereof and a minimum of friction at the journals of the rollers.

With this and other objects in view my invention consists in the novel construction and arrangement of parts hereinafter fully specified and claimed.

Figure 1:
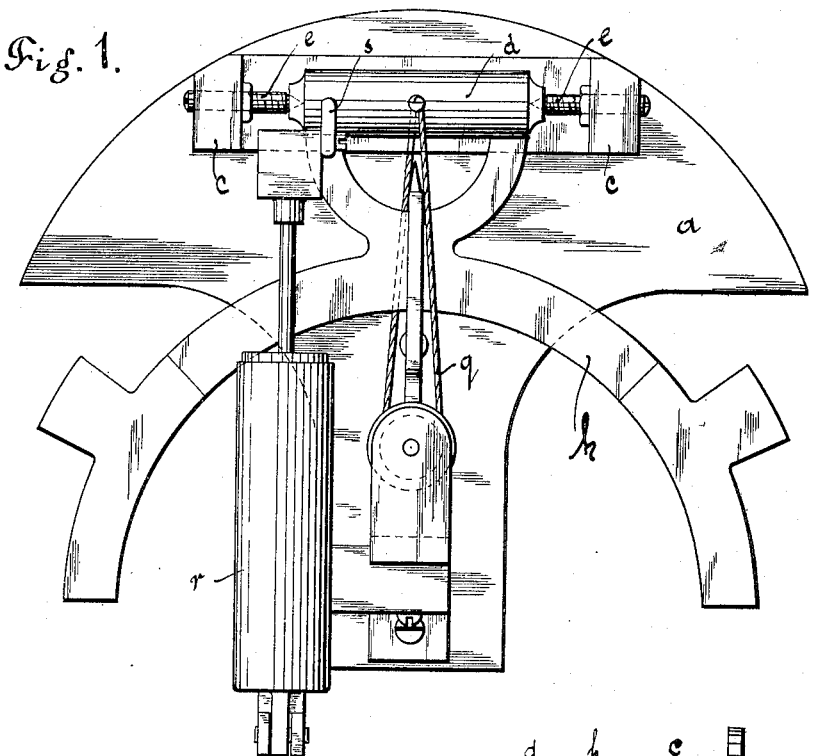
Figure 2:
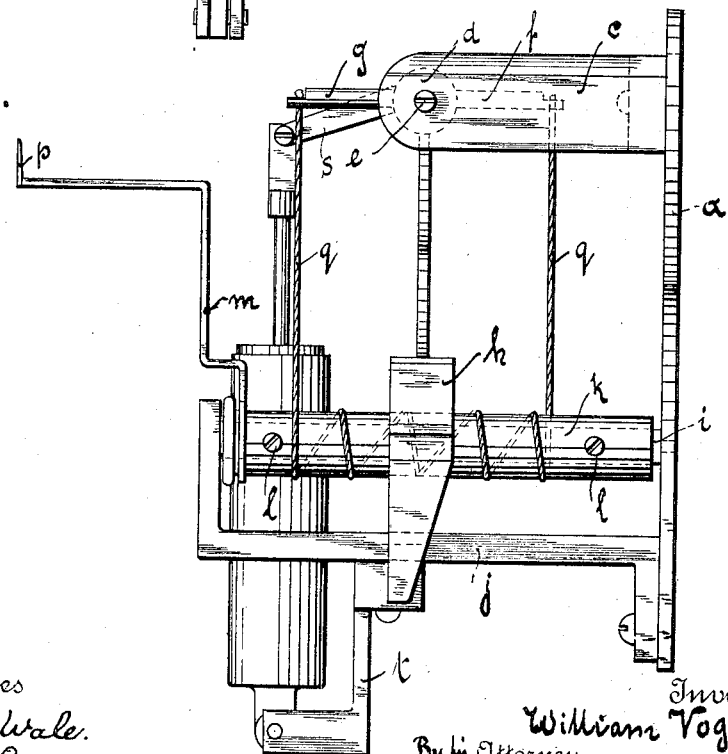
Figure 5:
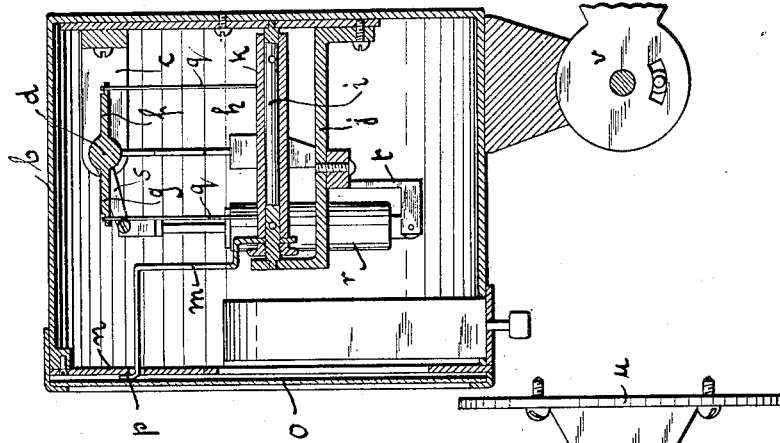
Figure 4:
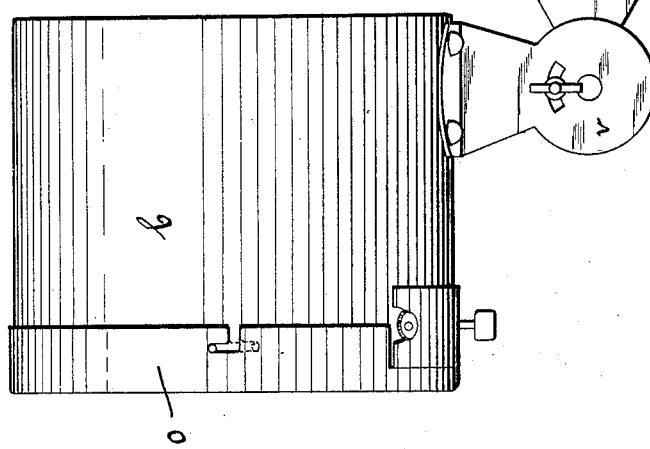
Figure 3:
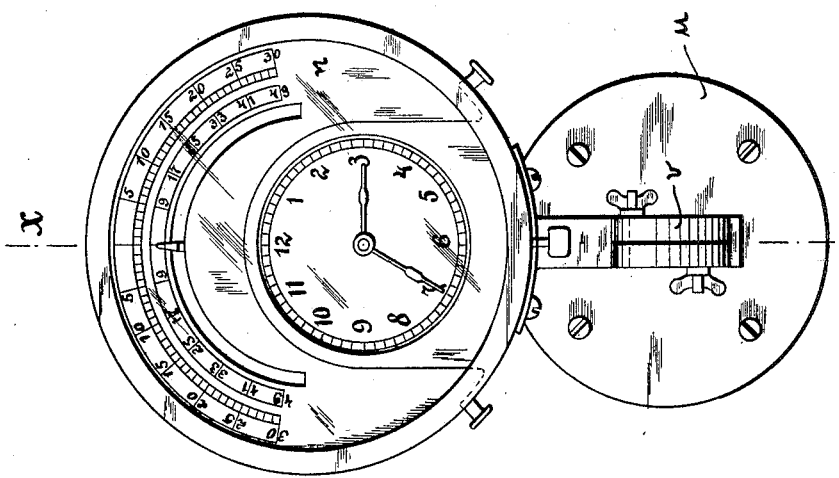

In the accompanying drawings, in which similar reference-letters denote corresponding parts, Figure 1 is an enlarged front elevation of the mechanism; Fig. 2, an enlarged side elevation thereof; Fig. 3, a front elevation of the case; Fig. 4, a side elevation; and Fig. 5 a central vertical section thereof, showing the mechanism fixed therein.

The reference-letter $a$ denotes the frame of the mechanism, which is adapted to be secured in a suitable case $b$, (see Figs. 3, 4, and 5,) the construction of which is hereinafter fully specified. Projecting forward from said frame $a$, at the upper part thereof, are lateral brackets $c\ c$, in which a driving-roller $d$ is journaled in horizontal position transversely thereto. The journals are formed by set-screws $e\ e$, working in threaded bores in the lateral brackets $c\ c$, engaging with their pointed inner extremities conical bores in the roller $d$. According to the adjustment of the said set-screws the roller $d$ is allowed to turn more or less easily around its horizontal axis. From the central parts of the circumference of the roller $d$ project in opposite directions at a right angle to the latter arms $f\ g$, said arms being rigidly secured to the roller or forming integral parts therewith. At a right angle to said arms $f\ g$ a weight or plumb $h$ is rigidly secured to the roller $d$ to always extend perpendicularly downward. This weight may of course be made in any suitable shape. In the example shown it consists of two semicircular arms curved downward, the lower extremities of the latter being formed of heavy solid metal blocks.

At a certain distance below and crosswise to the roller $d$ a horizontal axle $i$ is journaled at one end in the frame $a$ and at its other end in the bracket $j$, secured to the latter. Upon this axle $i$ a cylindrical sleeve $k$ is removably mounted and is attached thereto by means of set-screws $l\ l$ or in any other suitable manner. The forward end of the sleeve $k$ carries an angular lever $m$, which is rigidly secured thereto so as to turn in either direction, together with the said sleeve $k$ and axle $i$. The upper and outer end of said lever is adapted to project through a semicircular recess in a graduated plate $n$, arranged at the back of the glass cover $o$ of the case $b$, and to carry a pointer $p$. The roller $d$ and sleeve $k$ are connected by a cord $q$ or the like, which is wound around the latter sleeve $k$ and the extremities of which are attached to the outer ends of the arms $f\ g$ of the roller $d$.

The device, which when used, for instance, with an automobile or like vehicle to indicate the changes of grade is fixed to the dashboard, is so adjusted that the pointer normally will lie in the center of the graduation and point at zero. The weight $h$ will, due to gravity, hang perpendicularly downward. At any change of grade the weight will turn the roller $d$ in the corresponding direction, whereby one of the arms of the roller $d$ will be raised and the other lowered. The rising arm will pull the respective end of the cord $q$ and in winding it off from the cap $k$ will turn the latter around its horizontal axis. The angular lever $m$ and pointer $p$ will be thus turned to the right or left of zero and indicate the correct grade. The opposite end of the cord attached to the arm which is now being lowered will be wound around the roller $k$. Thus the slightest change of grade will be transmitted to the pointer and indicated on the dial. With the same effect the mechanism can be utilized for a level or indicator of the trim of a vessel.

To lessen or deaden the vibration of the movable parts of the mechanism while the automobile is in motion, I provide a small air-cylinder $r$, having a piston working therein, the piston-rod being pivoted to an arm $s$, rigidly secured to the roller $d$. The air-cylinder is at its bottom pivoted in a bracket $t$, secured to and extending downward from the bracket $j$, whereby it is allowed to swing to and fro when the piston is moved up and down by the rotation of the roller $d$.

In the present example I have shown my mechanism in such a shape as to serve as a grade-gage for vehicles. To this end I inclose it in a case $b$, in which it is removably secured to the rear wall. The cover $o$ is arranged so as to be removably secured to the case. For the attachment of the case to the dashboard of a vehicle I provide a plate $u$, with which the case may have a pivotal connection $v$, so as to allow the adjustment of the case into such a position in which the pointer will normally stand at zero.

In combination with my device I may arrange a clock, as shown in the drawings, or a distance-meter.

Having thus described the nature of my invention, what I claim, and desire to secure by Letters Patent, is—

1. In a grade-gage, the combination with a case provided with a dial, of a driving-roller, a sleeve arranged at a certain distance away from and perpendicularly to the said driving-roller, a weight or plumb rigidly secured to the driving-roller, flexible means wound around the sleeve and attached with its ends to opposite sides of the driving-roller, a pointer rigidly secured to the sleeve and projecting forward to register with the graduations on the dial, both roller and sleeve being capable of turning around their journals, substantially and for the purpose as specified.

2. In a grade-gage, the combination with a case provided with a dial, of a driving-roller, a sleeve arranged at some distance away perpendicularly to the said driving-roller, a weight or plumb rigidly secured to the driving-roller, arms projecting from opposite sides of the driving-roller, a cord wound around the sleeve and one end attached to each arm of the driving-roller, an angular arm rigidly secured to the said sleeve and projecting forward toward the dial, a pointer fixed to said angular arm and adapted to register with the graduations on the dial, substantially and for the purpose as specified.

3. In a grade-gage, the combination with a case provided with a dial, of a driving-roller, an axle arranged at some distance away, perpendicularly to said driving-roller, a cylindrical sleeve removably mounted on said axle, means connecting the sleeve with the axle to form a second roller, a weight or plumb rigidly secured to the driving-roller, arms projecting from opposite sides of the driving-roller, a cord wound around the sleeve of the second roller and attached by its opposite ends to the arms of the driving-roller, an angular arm rigidly secured to the sleeve of the second roller and projecting forward toward the dial, a pointer on the outer extremity of the angular arm and adapted to register with the graduations on the dial, substantially and for the purpose as specified.

4. A grade-gage comprising a case having an open face, a frame secured to the rear wall of said case, brackets projecting from said frame forward, a sleeve and a roller movably supported in said brackets, a weight rigidly secured to the said roller, a pointer rigidly secured to the said sleeve and projecting forward and outward of the case, flexible means for the transmission of movement from the roller to the sleeve, a dial fixed at the open face, a removable glass cover fitting over said open face, and means for the attachment of the case to the dashboard of a vehicle, substantially and for the purpose as specified.

5. A grade-gage comprising a case having an open face, a frame secured to the rear wall of said case, brackets projecting from said frame forward, a sleeve and a roller movably supported in said brackets, a weight rigidly secured to the said roller, and a pointer rigidly secured to the said sleeve and projecting forward and outward of the case, flexible means for the transmission of movement from the roller to the sleeve, a dial fixed at the open face, a removable glass cover fitting over said open face, a plate for the attachment of the case to the dashboard of a vehicle, a pivotal connection of the case with said plate for the adjustment of the device in normal position, substantially and for the purpose as specified.

6. A grade-gage, comprising a case having an open face, a frame secured to the rear wall of said case, brackets projecting from said frame forward, a sleeve and a roller movably supported in said brackets, a weight rigidly secured to the said roller, a pointer rigidly secured to the said sleeve and projecting forward and outward of the case, flexible means for the transmission of movement from the roller to the sleeve, cushioning means connected with the roller, a dial fixed at the open face, a removable glass cover fitting over said open face, a plate for the attachment of the case to the dashboard of a vehicle, a pivotal connection of the case with said plate for the adjustment of the device in normal position, substantially and for the purpose as specified.

In testimony whereof I affix my signature in presence of two witnesses.

WILLIAM VOGEL.

Witnesses:
   CLARENCE J. IRVING
   MAX D. ORDMANN.